Patented June 16, 1925.

1,542,790

UNITED STATES PATENT OFFICE.

GEORGE W. RELYEA, OF CHARLESTON, SOUTH CAROLINA.

MARINE PAINT.

No Drawing.   Application filed November 25, 1924.   Serial No. 752,122.

*To all whom it may concern:*

Be it known that I, GEORGE WALTON RELYEA, a citizen of the United States, and a resident of Charleston, in the county of Charleston and State of South Carolina, have invented certain new and useful Improvements in Marine Paints, of which the following is a specification.

This invention relates to paints adapted for use in marine work and has for its object the provision of a composition for forming a paint which will prevent barnacles from forming and also prevent the destruction of wood by bacteria or other living organisms or vegetable growths in water.

A further object of the invention is the provision of a paint formed of ingredients which are cheap and which will not be materially affected by the water when applied.

This invention will be best understood from a consideration of the following detailed description; nevertheless it is to be understood that the invention is not confined to the disclosure, being susceptible of such changes and modifications which shall define no material departure from the salient features of the invention as expressed in the appended claim.

In carrying out my invention I propose to utilize such ingredients which are cheap but which will make an effective paint for preventing living organisms from attacking wood thus treated. It has been proposed to use cyanide of mercury in combination with ingredients which normally form a paint but the mercury compound is not only expensive but is only effective for a short period during the immersion of the article in sea water.

I therefore employ 7½ pounds of Dutch boy red lead or any other red lead together with 2 pounds of Paris green, ½ pound of arsenious oxide or white arsenic. The above ingredients are mixed with sufficient linseed oil, raw japan dryer and creosote of pine to make a gallon of paint. The Paris green, red lead and arsenic are reduced to a fine state and thoroughly mixed and then incorporated in the linseed oil, creosote of pine and the dryer. This composition, when properly applied will last nine months or more when immersed in sea water and will not only prevent minute living organisms from attacking the wood but will also prevent to a great degree the formation of barnacles on the materials thus treated; and will prevent the vegetable growth of grass thereon.

What I claim is:

The composition of marine paint comprising 7½ pounds of red lead, 2 pounds of Paris green, ½ pound of white arsenic mixed with sufficient linseed oil, japan dryer and creosote of pine to provide a gallon of paint.

GEORGE W. RELYEA.